US010980262B2

(12) United States Patent
Doorn et al.

(10) Patent No.: US 10,980,262 B2
(45) Date of Patent: Apr. 20, 2021

(54) BARRIER LAYER CAPSULES

(71) Applicant: Givaudan, S.A., Vernier (CH)

(72) Inventors: Aloysius Lambertus Doorn, Zeewolde (NL); Michael Chaney, Ludlow, KY (US); Joshua Andrew Hagen, Cincinnati, OH (US); David Siegel, Hamilton, OH (US); Natalia Nikolova, Amelia, OH (US); Stephen Fenimore, Cincinnati, OH (US)

(73) Assignee: Givaudan S.A., Vernier (CH)

( * ) Notice: Subject to any disclaimer, the term of this patent is extended or adjusted under 35 U.S.C. 154(b) by 551 days.

(21) Appl. No.: 14/902,496

(22) PCT Filed: Jul. 8, 2014

(86) PCT No.: PCT/EP2014/064515
§ 371 (c)(1),
(2) Date: Dec. 31, 2015

(87) PCT Pub. No.: WO2015/004095
PCT Pub. Date: Jan. 15, 2015

(65) Prior Publication Data
US 2017/0000176 A1    Jan. 5, 2017

Related U.S. Application Data

(60) Provisional application No. 61/843,636, filed on Jul. 8, 2013.

(51) Int. Cl.
*A23L 27/00*    (2016.01)
*A23P 10/35*    (2016.01)
*A23P 10/30*    (2016.01)

(52) U.S. Cl.
CPC ............... *A23L 27/72* (2016.08); *A23P 10/30* (2016.08); *A23P 10/35* (2016.08); *A23V 2002/00* (2013.01)

(58) Field of Classification Search
CPC .......... A23P 10/30; A23P 10/35; A23L 27/72; A23V 2002/00
See application file for complete search history.

(56) References Cited

U.S. PATENT DOCUMENTS

| 6,174,554 B1 | 1/2001 | So |
| 2001/0021404 A1 | 9/2001 | Uhlemann et al. |
| 2007/0031582 A1 | 2/2007 | Burger et al. |

FOREIGN PATENT DOCUMENTS

| CA | 2 344 406 A1 | 3/2000 |
| EP | 0 380 066 A1 | 8/1990 |

(Continued)

OTHER PUBLICATIONS

PCT/EP2014/064515—International Search Report, dated Oct. 27, 2014.

(Continued)

*Primary Examiner* — Subbalakshmi Prakash
(74) *Attorney, Agent, or Firm* — Curatolo Sidoti Co., LPA; Salvatore A. Sidoti; Floyd Trillis, III

(57) ABSTRACT

An active-containing microparticle adapted to release the active in a desired end-use, comprising
(a) an active-containing core active-containing core, optionally formed on an inner core, comprising a continuous hydrophilic medium in which at least one active is dissolved or is present as? dispersed particles;
(b) an active-free barrier layer, surrounding completely the core; and
(c) surrounding the barrier layer, a layer of polymeric material having a solubility in water at 25° C. of 0.1% by weight maximum;
the barrier layer comprising a material selected from waxes, fats and materials suitable for use as the continuous hydrophilic medium of the core, and which is solid in the (Continued)

Figure 1:
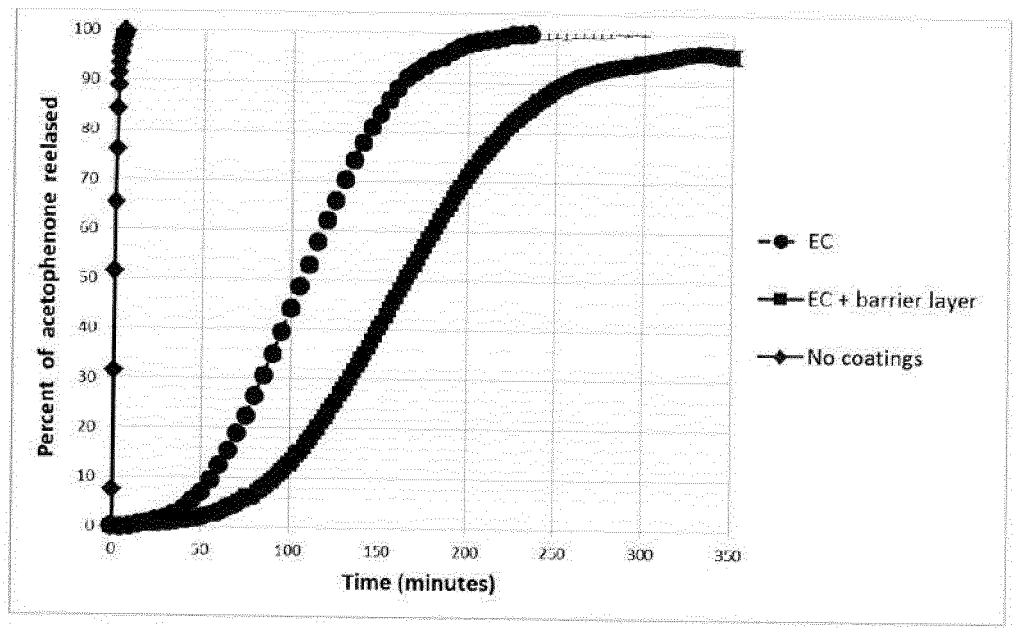

conditions of the desired end-use. The particles are useful, for example, for the delayed release of flavors in foods and beverages.

17 Claims, 1 Drawing Sheet

(56) References Cited

FOREIGN PATENT DOCUMENTS

| | | |
|---|---|---|
| EP | 0 852 912 A2 | 7/1998 |
| WO | WO 00/16643 A1 | 3/2000 |
| WO | WO 2004/089113 A1 | 10/2004 |

OTHER PUBLICATIONS

PCT/EP2014/064515—International Written Opinion, dated Oct. 27, 2014.
PCT/EP2014/064515—International Preliminary Report on Patentability, dated Jan. 12, 2016.
Marucci, M. et al., "Mechanistic Model for Drug Release During the Lag Phase From Pellets Coated With a Semi-Permeable Membrane", of Controlled Release Journal, Apr. 7, 2008, pp. 31-40, vol. 127, Issue 1. (Abstract only).

BARRIER LAYER CAPSULES

CROSS REFERENCE TO RELATED APPLICATIONS

This application is a national stage application of International Application No. PCT/EP2014/064515, filed 8 Jul. 2014, which claims priority from U.S. Provisional Patent Application No. 61/843,636, filed 8 Jul. 2013, which applications are incorporated herein by reference.

This disclosure relates to delivery particles for delayed release of flavors or other active agents in inter alia foods or beverages.

Encapsulation has been widely used for ensuring that active substances are partially or completely preserved for release at a desirable time. For example, in the preparation of consumable compositions, encapsulation can permit the addition of actives during preparation, processing or storing of a composition, which otherwise would be impossible, because the preparation, processing or storage conditions would destroy or otherwise cause reduced effectiveness of the active. An example of this may be found in PCT Published Application WO 2004/089113, in which capsules are used to prevent the oxidation of flavors on storage. (The following description will refer principally to flavors, a particularly important category of active, but the scope of the disclosure is not restricted to flavors and applies to any active whose encapsulation is desired, such as fragrances or non-flavor food or consumer product components).

While such capsules are indeed useful for these purposes, they are not always useful in more extreme conditions, such as those often found in food processing industries. Especially problematic are exposure to water and/or elevated temperature (for example, during cooking). Such conditions can result in the loss of some or the entire flavor, resulting in release during the processing, preparation or cooking of the food, or to release of the encapsulated flavor at an undesirable time during the product life cycle. Ideally, all of the encapsulated flavor should be present in the end-product to deliver the desired flavor sensation, but conditions normally encountered in food during preparation and consumption can result in the loss of some or all of the flavor, or to some components of the flavor, or release of the different chemical components of the flavor at different rates. All these effects can degrade the quality or intensity of the flavor impression at the desired point in the product life cycle.

There have been a number of attempts to overcome these deficiencies, but they have not been completely successful. One strategy is to enclose the flavor in a dissolvable core, and cover the core with a layer of semipermeable polymer. Semipermeable polymers are poorly permeable to the active that is being delivered and also poorly permeable to water. Ethyl cellulose is a frequently used polymer for this purpose in pharmaceutical delivery systems and flavor delivery systems (e.g., WO 2004/089113). Such encapsulation systems release active via the osmotic pump mechanism which has been described for pharmaceutical delivery systems (e.g., M. Marucci et al., "*Mechanistic model for drug release during the lag phase from pellets coated with a semi permeable membrane,*", *J. Controlled Release*, 2008, vol. 127, pp. 31-40). In a particularly useful form of this technology, an active delivery particle comprises an active-containing core and at least one outer protective layer of semipermeable polymer. After immersion in water or exposure to air at high relative humidity, such particles provide a well-defined lag time after such exposure, followed by release of the majority of the encapsulated active material at a rate that is nearly constant in time.

However, there are problems in using such systems for the delivery of chemicals with a wide variety of chemical structures, such as those found in flavors, fragrances and foods. Firstly, if different actives are encapsulated individually within capsules, which otherwise have the same composition and structure, the chemical nature of the active can have a major effect on the lag time and release rate of the resulting capsules. This makes it hard to predict the time course of release of different active agents in the same food or fragrance application. Secondly, particles encapsulating mixtures of more than one active agent can release the different components at rates that are different from the release of the individual components when encapsulated alone, in poorly-predictable ways. These two problems are a barrier to development of controlled release flavor or fragrance formulations.

Figure 2:
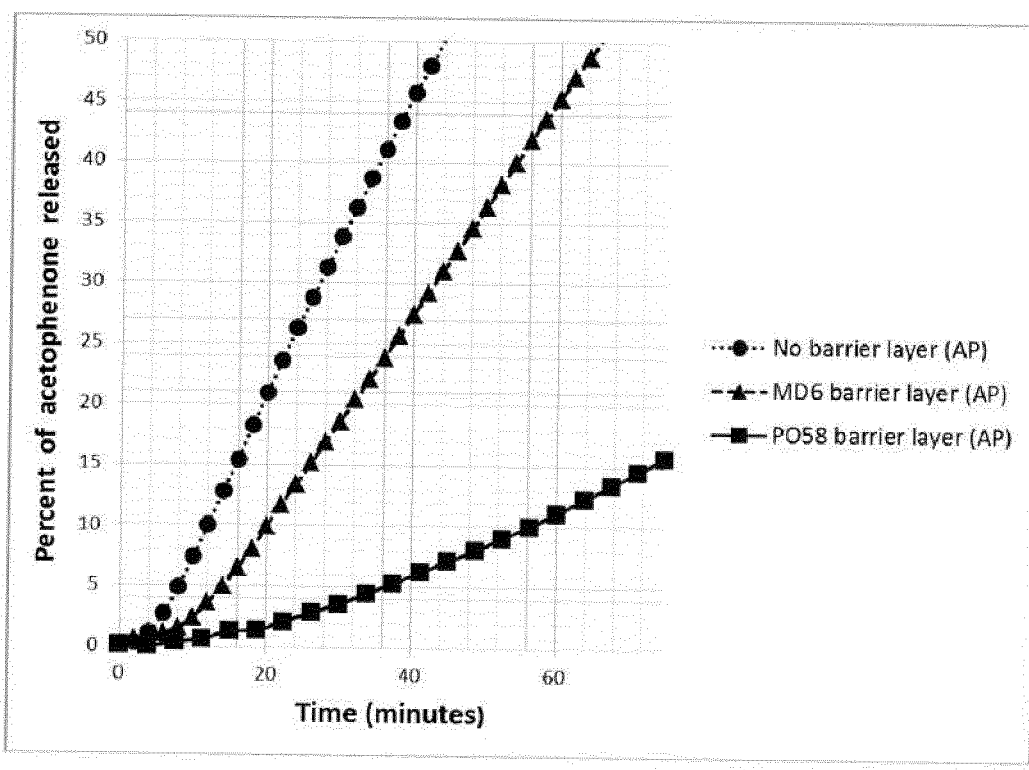

FIGS. 1 and 2 are graphical representations of the release rate of active over time for various exemplified microparticles.

It has now been found that it is possible to prepare active release particles that can retain the active for a long period and under conditions not normally tolerable to such particles. There is therefore provided an active-containing microparticle adapted to release the active in a desired end-use, comprising (a) an active-containing core, optionally formed on an inner core, comprising a continuous hydrophilic medium in which at least one active is dissolved or dispersed particles;

(b) an active-free barrier layer, surrounding completely the core; and (c) surrounding the barrier layer a layer of polymeric material having a solubility in water at 25° C. of 0.1% by weight maximum;

the barrier layer comprising a material selected from waxes, fats and materials suitable for use as the continuous hydrophilic medium of the core, and which is solid in the conditions of the desired end-use.

There is additionally provided a method of providing appropriately-releasable active in a consumable composition environment subject to water and/or heating, comprising adding to the consumable composition active in microparticle form, the microparticle, comprising (a) an active-containing core, optionally formed on an inner core, comprising a continuous hydrophilic medium in which at least one active is dissolved or dispersed particles;

(b) an active-free barrier layer, surrounding completely the core; and (c) surrounding the barrier layer a layer of polymeric material having a solubility in water at 25° C. of 0.1% by weight maximum;

the barrier layer comprising a material selected from waxes, fats and materials suitable for use as the continuous hydrophilic medium of the core, and which remains solid when subject to water and/or heating.

By "appropriately-releasable" is meant releasable over a desired time period. The nature of this desired release will naturally depend on the particular composition and desired time of release, but the microparticles of this disclosure allow the tailoring of release at any desired time in all circumstances. The determination of the nature of a suitable microparticle may be determined in every case by routine experimentation.

The active-containing core comprises a continuous medium in which is dissolved or dispersed active (liquid or solid). There may be more than one active. The continuous medium may be any suitable material, that is edible, hydrophilic (i.e., it swells or dissolves in water) and that is capable of retaining the active. Examples of suitable materials include long and short chain polysaccharides or substituted polysaccharides. Specific examples of these include maltodextrins, mon,- di-, tri- or oligo-saccharides, such as ribose, glucose, sucrose, fructose, sorbitol, mannitol, galactose, mannose or mixtures thereof; modified starches such as octenyl succinate-functionalized starch; emulsifying gums such as gum arabic and gum acacia, carrageenan or xanthan gum. The medium may also consist of or comprise protein hydrocolloids such as gelatin, or substituted polysaccharide hydrogels such as pectin and alginate, either as the acid or metal salt forms.

The active-containing continuous medium may comprise the total core, or it may itself be formed on an inner core. This inner core may be solid or liquid. For example, it may be any solid, edible substance, such as sugar, starch, cellulosic material and food acid. Alternatively, it may be liquid, and it might comprise active (the same as or different from the active in the surrounding layer). For example, it may be 100% active, or it may be active dispersed or dissolved in a solvent or carrier liquid. Examples include particulate plant matter, such as rice husk.

The active may be any desired active whose presence and delayed release are desired. It is typically a flavoring material, for example, a single flavor ingredient, or a blend of such ingredients, and it may be in liquid or solid form. However, it is possible to use any other desired active, such as a purely fragrant substance.

Surrounding this active-containing layer is a barrier layer. This may be made of the same continuous medium as used in the core, but containing no active. The purpose of this layer is to delay the release of the active, and its thickness is therefore dictated by the nature of the use and the length of the delay desired. However, typically the thickness of this further layer will be such that its weight fraction of the final particle will be from 3-80%, provided that it is at least 10 micrometers thick. Particular materials useful for such a layer are edible waxes and fats. Provided they are edible, and wax or fat may be used. Typical fats are the di-and triglycerides of glycerol that occur naturally. Waxes may be natural waxes or synthetic ones. Typical examples are hydrogenated triglycerides such as hydrogenated palm, cottonseed, canola or soybean oils; or waxes such as beeswax, candellila, rice, carnauba or paraffin wax.

A major requirement of the barrier layer is that it be solid in the conditions of the desired end-use. This end-use will determine the material used as a barrier layer. For example, if the end-use will involve use in hot or boiling water (for example, in a soup), the barrier layer material is selected such that the barrier layer will remain solid under such conditions. It will be realized that many of the potential barrier layer materials do not have sharp melting points, as do pure chemical substances, but soften over a range of temperature. In these cases, "solid" means that the material may soften, but may not flow under the particular temperature. Simple, routine experimentation can determine this in every case.

The final layer is a layer of a polymeric material having a solubility in water at 25° C. of 0.1% by weight maximum, that is, it is at best poorly water-soluble under the conditions of manufacture and use. Examples of suitable materials include ethyl cellulose, cellulose esters, cellulose ethers, zein, polyvinyl acetate and shellac.

The particles may be prepared by any known method. In the case of particles without an inner core, the active-containing core may be prepared, for example, by agglomeration of a powder made by spray drying in a fluid bed dryer; by spray drying of a flavor emulsion in a fluid bed dryer to build up a large aggregate in the size range of 100-2000 microns; by wet agglomeration of a spray-dried powder or other flavor powder in a high shear mixture and subsequent extrusion; by hot melt extrusion of a flavor-bearing matrix; or by formation of hydrogel-based matrix particles by multiple emulsion, axial co-extrusion, compaction or coacervation techniques. In each of these cases, the weight content of flavor in the matrix is determined by the composition of the system and the method used; this may be easily achieved by use of the ordinary skill of the art.

The barrier layer may be applied, for example, by any suitable means known to the art. Non-limiting examples include:
  coating via spraying as a melt, or via spraying of a solution, emulsion or suspension out of aqueous or non-aqueous solvent in a fluidized bed apparatus;
  coating as a melt, emulsion or suspension during pan coating.
  axial jet coaxial co-extrusion in the form of a solution, emulsion or suspension in aqueous or non-aqueous solvent, applied to the core.

The same methods may be used to apply the layer of poorly-soluble polymeric material. It may be applied as a solution in water, in one or more alcohols (typically ethanol or isopropanol) or a mixture thereof, for example ethanol with optionally up to 20% by weight of water).

The microparticles hereinabove described may be used in a wide variety of consumable compositions (i.e., a composition that is taken in the mouth, either for swallowing or expectoration) in which the delayed release of active is desired. There is therefore also provided a consumable composition, comprising a consumable composition base and active-containing microparticles as hereinabove described.

By "consumable composition base" is meant all those components of a desired consumable composition necessary for the composition, other than the microparticles. These are standard ingredients used in art-recognised proportions and include (but are not restricted to): flavors, colorants, surfactants, thickening and rheological agents, solvents, preservatives, sweeteners, off-note masking agents, and the like.

Difficulty may be encountered in adding the microparticles to some consumable compositions which have a high water activity, which are then stored for prolonged periods. Water activity, $a_w$, is a well-known parameter in food science. It is a measure of the free energy of water in a system relative to pure water, and is defined as the vapour pressure of water in equilibrium with the food divided by the vapour pressure of pure water at the same temperature. The water activity of pure water is 1. Values in foods range from 0.97 in milk and fruit juice to 0.2 or below in crackers. However, a solid food can also have high $a_w$ values, for example, raw meat (0.99) and salami (0.87).

The result of long storage periods (several hours or longer, depending on the temperature and shearing conditions) in high $a_w$, liquid environments, such as canned soups, is that the microparticles lose nearly all of their contents. Thus, for best results, the microparticles are used in stored solid or semi-solid compositions. In some cases these can have high values, for example ice cream. The suitability of the microparticles for storage and use in a consumable may be ascertained by simple, non-inventive experimentation in every case.

Examples of consumable compositions in which the microparticles may be use include foodstuffs and beverages of all kinds. Non-limiting examples of such foodstuffs and beverages include: (Make sure the examples of consumable compositions do not include those that don't provide a suitable environment)

- dehydrated and culinary foods, including cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology);
- meal solutions products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, vegetable, potato and rice dishes, and any of these types of foods made in a frozen reheatable form;
- meal embellishment products such as: dehydrated or frozen condiments, marinades, salad dressings, salad toppings, dips, breading, batter mixes, barbecue sauces, including recipe mixes for salad, sold as a finished product or as an ingredient within a product whether dehydrated or frozen.
- beverage mixes and concentrates, including but not limited to, alcoholic and non-alcoholic dry powdered beverages, all rehydratable forms of tea, coffee and cocoa;
- confectionery products, e.g., cakes, cookies, pies, candies, chewing gums, ice creams, sorbets, puddings, jams, jellies, and other condiments, cereal, and other breakfast foods, canned fruits and fruit sauces and the like;
- marinated and/or battered/breaded frozen foods;
- refrigerated, frozen or rehydratable milk, cheese, yoghurt and other dairy products.

The microparticles are especially useful in foodstuffs that have to be heated for substantial periods, for example, non high $a_w$, value soups, which tend to lose flavor during the heating. The microparticles enable flavor to be retained for a long period, resulting in a more flavorful final consumable product.

The disclosure is further described with reference to the following non-limiting examples, in which, unless otherwise stated, all parts and proportions are expressed by weight.

EXAMPLE 1

Acetophenone-Containing Microparticles with Microcrystalline Cellulose Cores and Coated with Ethyl Cellulose, with and without a Barrier Layer Microparticles were made using an inner core of microcrystalline cellulose spheres (Cellets™ 700) on to which an acetophenone flavor emulsion matrix was coated, with and without a barrier layer of MD6 starch, which comprised 9% of the final microparticles, and with a final coating of ethyl cellulose, the ethyl cellulose comprising 10% of the final weight of the microparticles.

Core Composition:
Spherical particles composed of microcrystalline cellulose (Cellets™ 700), with a size range spanning 700-1000 microns, were used as a core material.

Flavor Emulsion Coating Solution Preparation:
For 1 kg gum Arabic (GA) solution the following composition was used:
Gum Arabic: 240 g
Maltodextrin MD10 100 g
Sorbitol 60 g
Water (tap): 600 g All the powders were weighed into a plastic bag in the quantities listed above and mixed thoroughly. The contents of the bag were slowly added to the water (heated to 60° C.) under stirring, using a top stirrer. After mixing, the solution was cooled to room temperature. 472.5 g of the solution was mixed using a high shear homogenizer (Ultra-Turrax T25 at 24,000 rpm) and acetophenone (63 g) was added slowly using the homogenizer at full speed for 1 minute.

Barrier Layer Solution Preparation:
A 25% solution of maltodextrin MD6 was made at 50° C. and kept at this temperature during coating.

Final Ethyl Cellulose Coating Solution Preparation:
A 10% solution of ethyl cellulose in ethanol was prepared.

Fluid Bed Settings (Glatt GPCG-3 Coater)
The following conditions were used:

| Parameter | Flavor emulsion and barrier layer | EC solution (10% EC in ethanol) |
|---|---|---|
| Inlet air temperature ° C. | 92 | 60 |
| Product temperature ° C. | 58-62 | 40-45 |
| Pressure at nozzle (bar) | 3 | 3 |
| Fluidizing air (m3/h) | 45-55 | 45-55 |

Before the coating process was started, the fluid bed was pre-heated to avoid cold spots in the machine and to achieve the desired product temperature quicker. After pre-heating, the machine was stopped and 315 g of core material was fed to the fluidization unit.

Coating with Flavor Emulsion.
Coating of the emulsion (535.5 g total) was started immediately after re-starting, using a feed rate of 10 g/minute, which is sufficiently low to avoid agglomeration of the individual particles. The feed rate of the GA emulsion was slowly adapted to such a level that the desired product temperature will be obtained as mentioned in the table above (approximately 20 g/minute).

Coating with Barrier Layer Solution.
The barrier layer solution (total 252 g) was added to the fluid bed coater through the same feed tube as the flavor emulsion, at a feed rate that permitted the maintenance of the desired product temperature (again about 20 g/min). For those microparticles that lacked a barrier layer, this step was skipped.

Ethyl Cellulose Coating.
After emulsion coating or barrier layer coating, the feed tube and spray nozzle were cleared with water, and then spraying was started using the ethanolic ethyl cellulose solution (total 700 g).

For purposes of comparison, some of the microparticles were not coated with the ethyl cellulose coating.

Measuring the Rate of Flavor Release from the Microparticles in Water.
The rate of flavor release from the microparticles was measured using a USP2 apparatus equipped with a fiber optic system for measuring UV-visible absorbance as a function of time under controlled shear conditions (Hanson Research SR8Plus with a Cary 50 Spectrophotometer and a Cassini Multiplexer). Tests were done at 30° C. and a paddle revolution rate of 150 RPM.

The results are shown in the graph of FIG. 1. The curve labeled "No coatings" is for release of acetophenone from cores which were not subjected to the final EC coating step. The curve labeled "EC" corresponds to cores that had been coated with EC, but without the intervening barrier layer of MD6 starch. The curve labeled "EC+barrier layer" is for capsules with both a barrier layer plus the outer EC layer. Clearly the presence of the EC coating results in a substantial lag time before release occurs, and a much slower release rate. However, the presence of the barrier layer delays the onset of release very substantially: the time required to release 10% of the flavor nearly doubles for acetophenone when the barrier layer is introduced.

EXAMPLE 2

Microparticles Containing Both Acetophenone and Methyl Salicylate, on Fluid Bed Aggregate Cores, Coated with 15% Ethyl Cellulose, with and without Barrier Layers Consisting of MD6 Starch or High-Melting Palm Oil Fat (PO58)

The cores for these samples were made by fluid bed agglomeration of spray-dried powder with the same flavor composition as that of Example 1, except that the final flavor load was approximately 9% each of acetophenone and methyl salicylate (63.5 g of each was added to the flavor emulsion). The coating protocol for the ethyl cellulose layers was the same as in Example 1, but was slightly different for the PO58 layer, which was applied as follows.

| Parameter | PO58 coating |
| --- | --- |
| Inlet air temperature ° C. | 50 |
| Product temperature ° C. | 45-48 |
| Pressure at nozzle (bar) | 1 |
| Fluidizing air (m3/h) | 35-45 |

The PO58 barrier layer the coating process was applied as follows. After flavour coating, the process was stopped and feed tubes and the nozzle section were cleaned and dried. The PO58 coating then was applied using the settings as in the table above (fixed feed rate of approximately 8 g/minute). PO58 was kept at a temperature of 100° C. during coating; the feed tube was heated to 100° C. using heated tracings. Furthermore, the nozzle air was heated to 100° C. as well, to avoid any tendency of PO58 to solidify in the feed lines.

Application of an EC coating after a PO58 coating proceeded as described in Example 1. The final weight of PO58 in the capsules was 10 weight percent.

The release rate of acetophenone was measured for the microparticles using the same methodology as in Example 1, but at a temperature of 50° C. (the methyl salicylate release was also measured, but as its graphs are close to the equivalent acetophenone graphs, they have been omitted). The circular data points are for release of acetophenone with no barrier layer, the triangles for the release with an MD6 barrier layer and the squares for the release with a PO58 barrier layer.

It can be seen that the presence of the MD6 barrier layer delays the onset of flavor release (it takes about 20 minutes for flavor release to reach 10%; respectively). It also slightly reduces the release rate for both model flavors at longer times. The presence of a PO58 barrier layer very substantially increases the lag time and decreases the flavor release rate for the flavors.

The invention claimed is:
1. An active-containing microparticle adapted to release the active in a desired end-use, comprising
   (a) an active-containing core, optionally formed on an inner core, comprising a continuous hydrophilic medium in which at least one active is dissolved or is dispersed as particles;
   (b) an active-free barrier layer, surrounding completely the core; and
   (c) surrounding the barrier layer, a layer of polymeric material having a solubility in water at 25° C. of 0.1% by weight maximum;
   the barrier layer consisting of a material suitable for use as the continuous hydrophilic medium of the core, and which is solid in the conditions of the desired end-use, selected from long chain polysaccharides, short chain polysaccharides, substituted polysaccharides, modified starches, emulsifying gums, protein hydrocolloids and substituted polysaccharide hydrogels.
2. The microparticle according to claim 1, in which the continuous hydrophilic medium with dissolved or dispersed active constitutes the entire core.
3. The microparticle according to claim 1, in which the core comprises an inner core, on which the continuous hydrophilic medium with dissolved or dispersed active is deposited.
4. The microparticle according to claim 3, in which the inner core is selected from sugar, starch, food acid and cellulosic material.
5. The microparticle according to claim 1, in which the core comprises an inner core that is liquid and optionally comprises an active, which may be the same as, or different from, the active in the continuous hydrophilic medium.
6. The microparticle according to claim 1, in which the active is a flavor.
7. The microparticle according to claim 1, in which the hydrophilic medium is selected from long chain polysaccharides, short chain polysaccharides and substituted polysaccharides.
8. The microparticle according to claim 1 in which the polymeric material having a solubility in water at 25° C. of 0.1% by weight maximum is selected from ethyl cellulose, cellulose esters, cellulose ethers and shellac.
9. A consumable composition, comprising a consumable composition base and active-containing microparticles according to claim 1.
10. A method of providing appropriately-releasable active in a consumable composition environment subject to water and/or heating, comprising adding to the consumable composition active in microparticle form, the microparticle, comprising
   (a) an active-containing core, optionally formed on an inner core, comprising a continuous hydrophilic medium in which at least one active is dissolved or dispersed particles;
   (b) an active-free barrier layer, surrounding completely the core; and
   (c) surrounding the barrier layer a layer of polymeric material having a solubility in water at 25° C. of 0.1% by weight maximum;

the barrier layer consisting of a material suitable for use as the continuous hydrophilic medium of the core, and which remains solid when subject to water and/or heating, selected from long chain polysaccharides, short chain polysaccharides, substituted polysaccharides, modified starches, emulsifying gums, protein hydrocolloids and substituted polysaccharide hydrogels.

11. The microparticle according to claim 4, in which the cellulosic material is particulate plant matter.

12. The microparticle according to claim 1, wherein the long chain polysaccharides, short chain polysaccharides and substituted polysaccharides are selected from maltodextrins, mono-saccharides, di-saccharides, tri-saccharides, oligo-saccharides and mixtures thereof.

13. The microparticle according to claim 12, wherein mono-saccharides, di-saccharides, tri-saccharides and oligo-saccharides are selected from ribose, glucose, sucrose, fructose, sorbitol, mannitol, galactose, mannose and mixtures thereof.

14. The microparticle according to claim 1, wherein the modified starch comprises octenyl succinate-functionalized starch.

15. The microparticle according to claim 1, wherein the substituted polysaccharide hydrogels are selected from pectin and alginate.

16. The microparticle according to claim 1, wherein the emulsifying gum is selected from gum arabic, gum acacia, carrageenan and xanthan gum.

17. The microparticle according to claim 1, wherein the protein hydrocolloid is gelatin.

* * * * *